Nov. 1, 1927.
T. W. CASE
1,647,503
REPRODUCING AMPLIFIER
Filed March 11, 1924
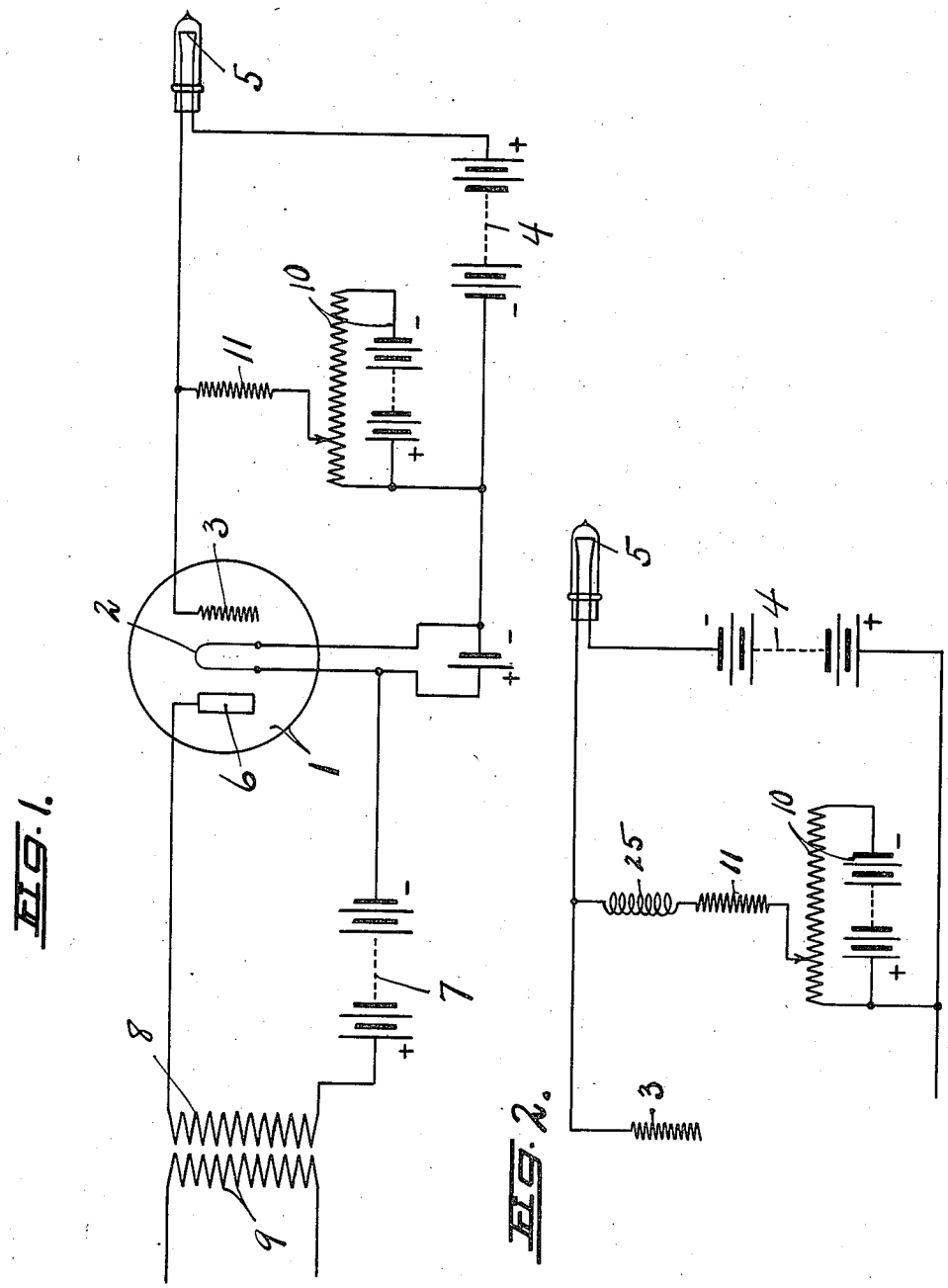

Patented Nov. 1, 1927.

1,647,503

UNITED STATES PATENT OFFICE.

THEODORE WILLARD CASE, OF AUBURN, NEW YORK, ASSIGNOR TO CASE RESEARCH LABORATORY INC., OF AUBURN, NEW YORK, A CORPORATION OF NEW YORK.

REPRODUCING AMPLIFIER.

Application filed March 11, 1924. Serial No. 698,416.

This invention relates to certain improvements in reproducing amplifiers, and is particularly designed for use in connection with the reproduction of sound waves from a photographic record of light waves as varied by sound waves.

In a general way, apparatus of this character comprises an electrical system including a light reactive cell or resistance, a source of potential, and a translating device, together with any number of stages and amplification desired.

My invention relates particularly to a means for varying and adjusting the grid potential of an audion or electroionic discharge device used to obtain the most effective operation of the apparatus, especially over a substantially straight line portion of the characteristic curve of the filament plate circuit of the audion in connection with light reactive cells or resistance of slightly varying characteristics.

Other objects and advantages relate to the details of the apparatus, all as will more fully appear from the following description, taken in connection with the accompanying drawings, in which:—

Figure 1 is a diagrammatic illustration of an apparatus embodying my invention.

Figure 2 illustrates a modified form of apparatus.

The apparatus as illustrated comprises an audion bulb or electroionic discharge device —1—, the filament 2 and grid —3— of which are connected in an electric circuit including a source of potential —4— and a light reactive cell or resistance —5—, which cell may be of the form and character described, and claimed in Letters Patent No. 1,316,350 issued to me.

The filament —2— and plate —6— of the audion are connected in an electric circuit including a source of potential —7—, and if no further amplification is desired, any suitable translating device such as telephone receivers, may be included in the filament plate circuit. Where, however, further amplification is desired, the primary —8— of a transformer may be inserted in the filament plate circuit in place of the translating device for co-operation with the secondary —9— included in the filament grid circuit of the next stage of amplification, all in the well known manner.

The invention described and claimed here relates particularly to an apparatus and structure by means of which the grid potential can be adjusted and varied to obtain the most efficient operation of the structure, and the means here shown for that purpose consists of a potentiometer —10— and a preferably fixed resistance —11— in shunt with the filament grid circuit of the audion device and across the filament and grid of said device. By proper adjustment of the potentiometer, the most efficient grid potential can be obtained and the operation of the apparatus can be maintained over a substantially straight line portion of the characteristic curve of the plate filament circuit, and this possibility of varying and controlling the grid potential is particularly advantageous because of the fact that light reactive cells or resistances vary somewhat in their characteristics, and the apparatus permits of adjustment to meet such varying characteristics and obtain maximum efficiency of operation.

Without restricting the invention in any way, and by way of illustration only, for the purpose of specifically disclosing one efficient operable structure, the elements of the apparatus may have the following values:—

The battery 4 may be approximately 135 volts.

The plate battery —7— may be approximately 130 volts.

The fixed resistance 11 is preferably of comparatively high resistance as for instance 500,000 ohms for the reason that the efficiency of the circuit is increased with increase of resistance.

The potentiometer resistance may be approximately 1800 ohms.

The potentiometer battery may be approximately 22½ volts. Obviously this disclosure of particular values is merely illustrative of one operative embodiment of my invention, and is not disclosed by way of limitation.

In Figure 2 a modified form of apparatus is illustrated in that a choke coil 25 is inserted in the short circuit preferably combined with the resistance —11— and the potentiometer —10— altho the choke coil —25— may be used alone, if desired, and acts to cause the variations impressed upon the circuit by reason of variations of resistance of the light reactive cell —5— to go to the grid and prevents loss through the resistance.

Altho I have shown and described a specific apparatus as illustrative of an embodiment of my invention, I do not desire to restrict myself to the exact details of the apparatus or structure, as various changes may be made within the scope of the appended claims.

I claim:

1. A reproducing amplifier comprising a bulb containing a filament and a grid, a circuit connecting the filament and grid and containing a source of potential and a light reactive cell, and means in shunt with the filament grid circuit for controlling the grid potential whereby uniform reproduction with light reactive cells of varying characteristics can be effected.

2. A reproducing amplifier comprising a bulb containing a filament and a grid, a circuit connecting the filament and grid and containing a source of potential and a light reactive cell, and means connected across the filament and grid for controlling the grid potential whereby uniform reproduction with light reactive cells of varying characteristics can be effected.

3. A reproducing amplifier comprising a bulb containing a filament and a grid, a circuit connecting the filament and grid and containing a source of potential and a light reactive cell, and a potentiometer connected across the filament and grid for controlling the grid potential whereby uniform reproduction with light reactive cells of varying characteristics can be effected.

4. A reproducing amplifier comprising a bulb containing a filament and a grid, a circuit connecting the filament and grid and containing a source of potential and a light reactive cell, a potentiometer and a resistance connected across the filament and grid for controlling the grid potential whereby uniform reproduction with light reactive cells of varying characteristics can be effected.

In witness whereof I have hereunto set my hand this 18th day of February, 1924.

THEODORE WILLARD CASE.